Patented Jan. 22, 1924.

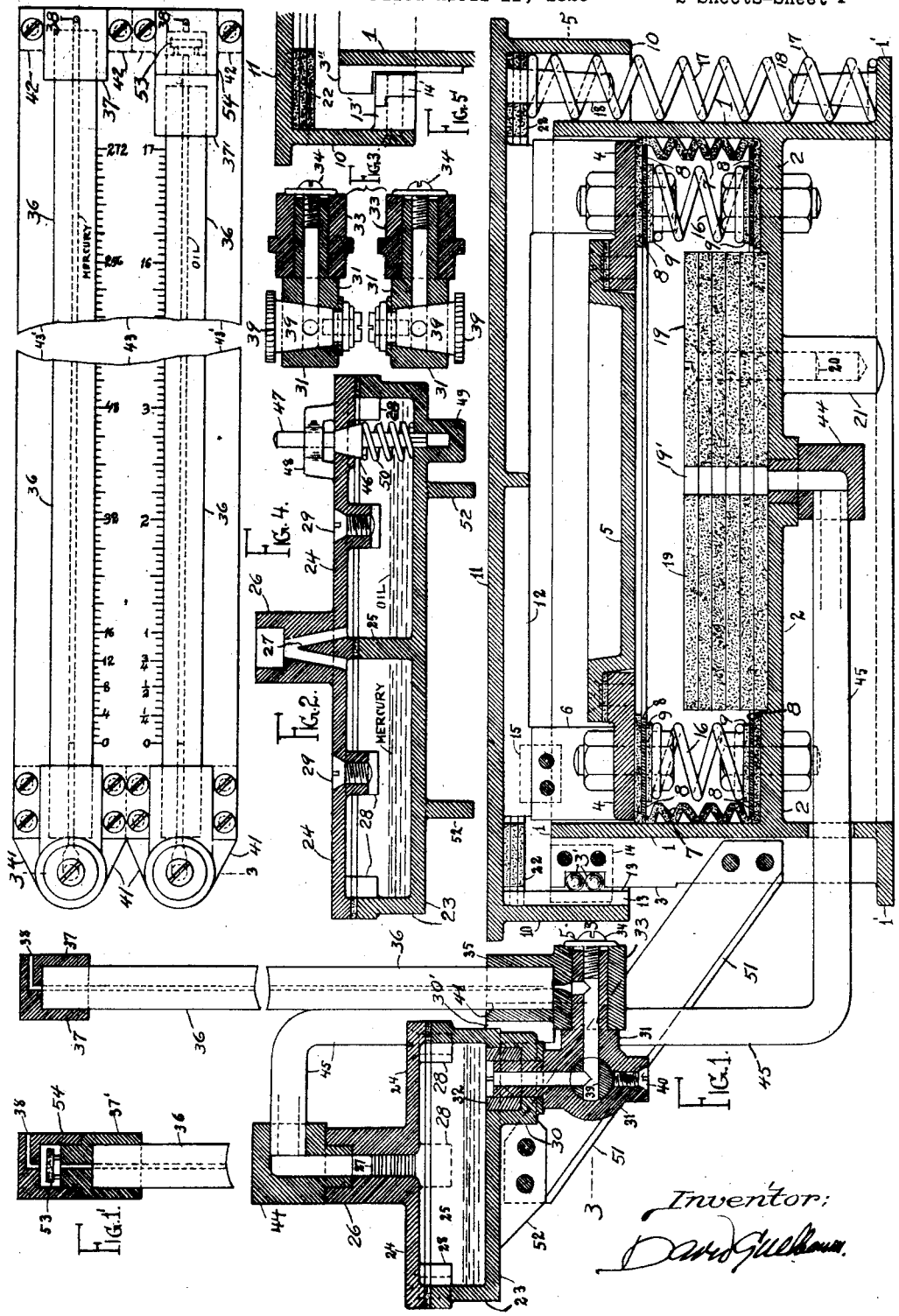

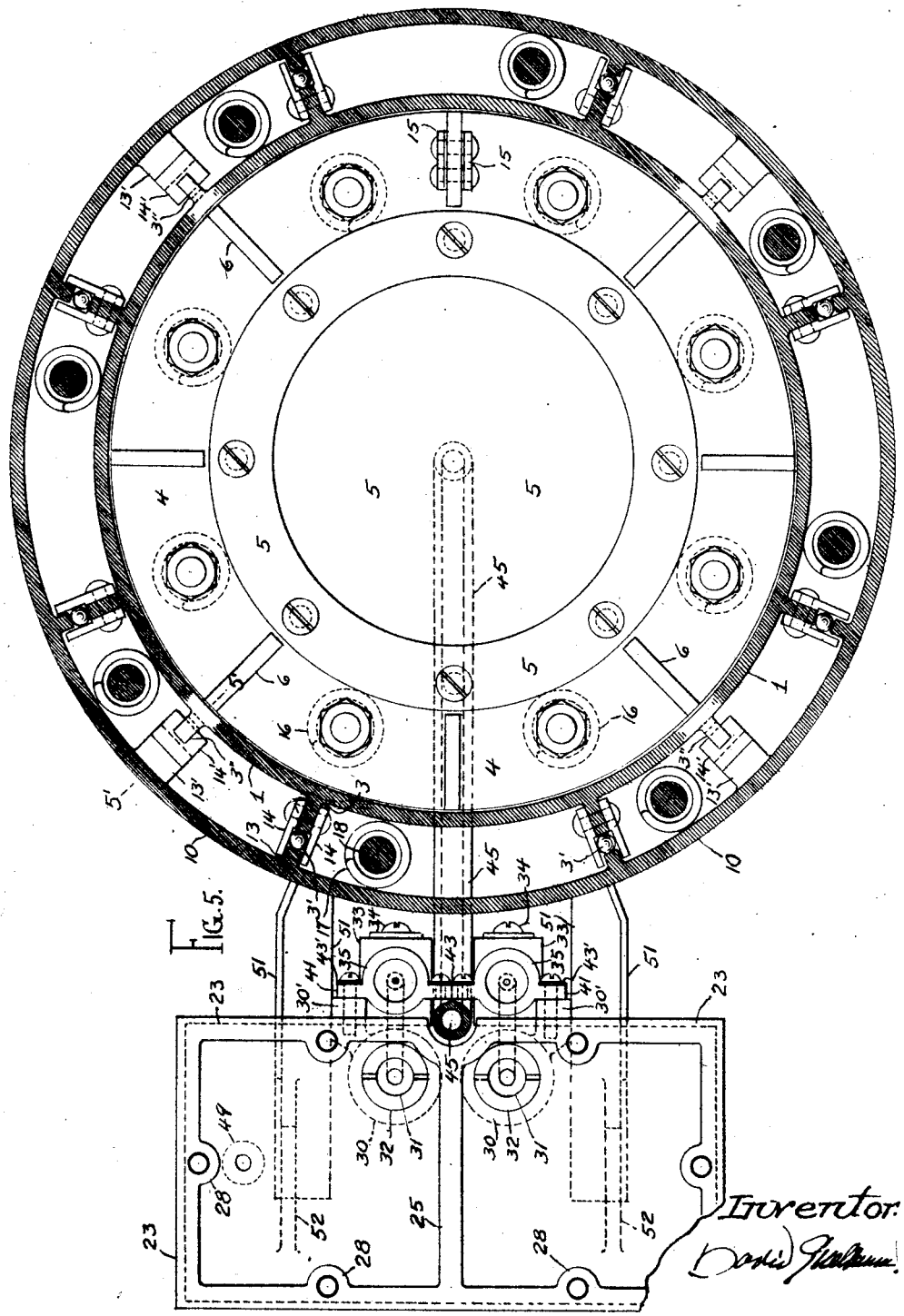

1,481,362

UNITED STATES PATENT OFFICE.

DAVID GUELBAUM, OF SYRACUSE, NEW YORK.

UNIVERSAL PNEUMATIC WEIGHING SCALE.

Application filed April 11, 1923. Serial No. 631,354.

*To all whom it may concern:*

Be it known that I, DAVID GUELBAUM, a citizen of the United States, and a resident of Syracuse, in the county of Onondaga and State of New York, have invented a certain and useful Universal Pneumatic Weighing Scale, of which the following is a specification.

My invention of a universal pneumatic weighing scale has for its object the weighing of all kinds of loads, large and small, by means of air compression within a contractible closed air space, said compression being indicated simultaneously on two barometric glass tubes, one giving the weight up to an ounce for small loads, say up to 20 pounds, the other one giving the weight in pounds, for large loads, up to hundreds of pounds, with no levers or hinges of any kind, and occupying no more space than common scales used in stores.

My invention comprises the above novel features, embodied in combinations and constructions as hereinafter described and claimed and as illustrated in the accompanying drawings, in which similar characters denote the same parts.

Fig. 1 is a vertical section of my universal pneumatic weighing scale in its ensemble.

Fig. 1' shows the socket and float on top of the glass oil pipe.

Fig. 2 is a longitudinal section of the two-compartment fluid well.

Fig. 3 is a horizontal section thru the tri-way cocks below the well.

Fig. 4 is a front view of the glass pipes with the graduation plate.

Fig. 5 sheet 2 is an ensemble top view on line 5—5 with the fluid well cover removed.

Fig. 5' sheet 1 is a fractional section on line 5'—5' sheet 2, showing the provision for lifting the whole scale when grasping and lifting the weighing platform.

As seen on Fig. 1, 1 is a stationary cylinder with an open top and a flanged bottom 1', with the intermediate blank bottom 2 cast on between and with the radial vertical ribs 3 outside, Figs. 1 and 5.

Inside of said cylinder 1 is telescoping the flange 4 with its radial vertical ribs 6 on top and having a hole in centre closed by the fastened on cover 5, Figs. 1 and 5.

Between the stationary blank bottom 2 and the telescoping flange 4 is placed and fastened to them with bolts the corrugated flanged cylinder 7, forming a closed contractible air space inside the stationary cylinder 1, as shown on Fig. 1. The corrugated cylinder 7 may be made of any pliable impervious to air fabric, like rubber, or of thin corrugated metal plate easily yielding to contraction and expansion. To keep constant the area of the movable flange 4 exposed to the varying air pressure within the closed air space, the plate rings 8 are introduced, fastened to the rubber flanges by the bolts with the rubber washers 9 at the bolt heads, making the closed space air tight.

Outside the stationary cylinder 1 is telescoping the movable cylinder 10, having an open bottom and a closed flat top 11, serving as a weighing platform, its horizontal inner ribs 12 resting on the ribs 6 of the movable flange 4 and its vertical inner ribs 13 being close to and opposite the outer ribs 3 of the stationary cylinder 1, as shown on Figs. 1 and 5.

To prevent friction and binding between the movable ribs 13 and the stationary ribs 3, the latter are notched out at the top and the bearing balls 3' are introduced, held in position by the clips 14 fastened to the ribs 3 on either side, as shown on Fig. 1 in elevation, and on Fig. 5 in horizontal section. These clips also prevent the movable cylinder 10 from turning relative to the stationary cylinder 1. Likewise, the clips 15 fastened to either side of one of the vertical ribs 6 on the movable flange 4 and engaging the resting on it rib 12 of cylinder 10, Figs. 1 and 5, prevent the movable flange 4 from turning relative to the stationary cylinder 1.

The lugs 13', shown on Figs. 5' and 5, cast on the cylinder 10 at its bottom inside and carrying the little blocks 14', close to the lugs 3'' cast on the stationary cylinder 1 at its top, are provided for lifting the whole scale body when grasping and lifting the platform 11 or the cylinder 10. The little blocks 14' are prevented from shifting sideways by the screwed in pins, shown dotted on Fig. 5'.

To hold the movable cylinder 10 and flange 4 suspended and the corrugated cylinder 7 normally inflated, the springs 16 are introduced into the closed air space, held fast between the bolt heads. In case of scales for heavy loads, up in tons, with correspondingly heavy weighing platforms, the auxiliary outer springs 17 winding around the cast or fastened on pins 18 are provided, as shown on Figs. 1 and 5.

Into the closed air space of the contractible cylinder 7 are introduced the plates 19, Fig. 1, held in position by the screws 20, shown dotted, screwing into the sockets 21 cast on the blank bottom 2 and having the hole 19' in centre for an air passage. By increasing or decreasing the number of these plates the closed air space volume is adjusted to suit the desired maximum load to be weighed.

Likewise, the rings 22 inside the cylinder 10 are provided for adjusting the drop of the platform 11 coming to rest on top of cylinder 1, to suit the desired maximum load. The rings 22 instead of being held on to the top 11 of cylinder 10 by the springs 17, as shown on Fig. 1, may be placed freely on top of cylinder 1 and its ribs 3 and holes cut out in the rings to clear the springs 17.

The weight of the loads indicating mechanism consists of the closed fluid well 23 with its air tight cover 24, Figs. 1 and 2, divided by the inner partition 25 into two compartments, one holding a small quantity of mercury, the other a small quantity of oil. The cover 24 has a nozzle 26 in its middle communicating with both fluid compartments and provided with the baffle 27 inside forming a continuation of the partition 25, so that the fluid from one compartment cannot pass over to the other one, while the air spaces above the fluids freely communicate with each other, as seen on Fig. 2.

The cover 24 is fastened to the well with screws entering the bosses 28 inside the well, as shown on Figs. 1 and 5; the two screw plugs 29, Fig. 2, in the cover are provided for introducing the required quantity of fluid into each compartment after the scale is all assembled.

To the bottom of the well 23, on either side of the partition 25, is cast on the socket 30, into which enters one end of the tri-way cock 31, held fast by the nut 32, as seen on Figs. 1 and 5. The other end of the tri-way cock 31 enters the horizontal socket 33 and is held fast by the screw and washer 34, Figs. 1 and 3.

To the horizontal socket 33 is cast on the vertical socket 35, holding the bottom of the upright glass pipe 36 and communicating at its bottom with the tri-way cock 31, as seen on Fig. 1. The top of the glass pipe 36 is covered by the inverted socket 37 with the air passage 38, communicating the interior of the pipe with the atmospheric air. By means of the tri-way cock 31 the bottom of the glass pipe 36 can be communicated with or cut off from the fluid in the well. Thus, turning the plug 39 180° the pipe 36 will be cut off from the well, and by loosening the screw pin 40 may be emptied out without disturbing the well. Likewise, by turning the plug 39 90° to the left, the well is cut off from the pipe and may be emptied out by loosening the pin 40 without disturbing the glass pipe.

To the ribs 41 on the lower vertical sockets 35 and to the ribs 42 on the top sockets 37, Figs. 1 and 4, is fastened the graduation plate 43; the side plates 43' serve for protecting the glass pipes 36, and may be graduated too if desired. The outer ribs 41 are fastened to the lugs 30', Fig. 5, cast on the well, for stiffness.

The closed contractible air space within the corrugated cylinder 7 is connected to the nozzle 26 on top of the well cover 24 by means of the fittings 44 and the pipe 45, communicating permanently with the air spaces above the fluids in the well and forming together one closed contractible air space, as seen on Fig. 1.

The closed well 23 is also provided inside with the small valve plug 46, Fig. 2, mounted in the cover 24, with its stem 47 passing thru the yoke 48 cast on the cover 24 and into the small socket 49 in the bottom of the well 23 and is held up close to its seat by the spring 50. By pushing down the stem 47 the entire closed air space communicates with the atmosphere and assumes the outside atmospheric pressure; upon releasing the stem 47, the spring 50 instantly restores the plug 46 to its seat, and the entire air space within the well and the corrugated cylinder becomes closed again.

The well with the glass pipes and graduation plates is supported by the angle braces 51, Figs. 1 and 5, fastened with one end to the vertical ribs 3 on the stationary cylinder 1 and with its other end fastened to the ribs 52 cast on the bottom of the well. But the well with the glass pipes and graduation plates may as well be located at any distance from the scale proper, or may be fastened to the wall, and connected to the blank bottom of the scale by a flexible pipe.

The action of the pneumatic scale is as follows:

When there is no load on the platform 11, Fig. 1, the weight of the movable flange 4 and the cylinder 10 is balanced by the springs 16, or by the springs 16 and 17, in case of scales for extra heavy loads; within the closed air space the pressure is the same as that of the outside atmosphere, and the fluid levels in the well and in the barometric glass pipes will be the same and coincide with the zero marks on the graduation plate 43, Fig. 4.

Should the scale be taken up the top of a mountain, or down the pit of a mine, causing a sudden change of altitude, or in case of a sudden change in the temperature, atmospheric pressure within the closed contractible air space may be instantly re-established by pressing down the stem 47 of the spring plug, Fig. 2, as previously explained.

Let now a load be placed on the platform 11; it will move down a little and compress the air within the closed air space. The excess pressure over the atmosphere, acting upward on the bottom side of the flange 4, will balance the load.

Assuming for instance that the closed air space has been contracted $1/3^d$, that is, the contracted volume of the closed air space is $2/3^d$ of what it was before, and that the bottom area of the flange 4 exposed to the excess pressure measures 40 sq. inches. Then, the excess air pressure upwards amounts to 294 pounds; at 1/2 contraction of the closed air space volume, the excess pressure upward will double and amount to 588 pounds, which shows the sensitiveness and effectiveness of the pneumatic scale, and the drop of the platform, in practice, will be confined to but a few sixteenths of an inch.

The excess pressure per sq. inch is indicated by the height of the fluid film in the glass pipes, Fig. 4, over the zero marks, and the figures on the graduation plate 43, giving the corresponding weights of the loads, are recorded from actual test weights and include the weight corresponding to the slight additional pressure upward due to the slight additional contraction of the balancing springs.

The ratio of the surface area of the fluids within the well to the cross section of the films in the glass pipes is more than 1000 to 1, so that the level of the fluids in the well is practically constant and always coinciding with the zero marks on the graduation plate within less than $1/64^{th}$ of an inch.

The oil used in one of the glass pipes to indicate the excess pressure may be of any degree of lightness. For turpentine naptha, for instance, the ratio of its specific gravity to that of mercury is just about 1 to 16, so that the film in the oil pipe will be 16 times longer than the film in the mercury pipe, over the zero marks, for the same load, and the same divisions at the oil pipe graduation will indicate ounces instead of pounds.

To prevent the oil from over running the glass oil pipe in case of heavy loads, the small rubber or cork float 53, Fig. 1', is introduced in the top socket 54 screwed on over the top socket 37', which closes the air passage 38 in the top socket 54 when the pipe gets full of oil, so that under heavy loads the oil pipe stays filled up until the load is removed, while for light loads, say up to about 20 pounds, it indicates the weight in pounds and ounces.

Thus, the "universal pneumatic weighing scale" gives the weight of small loads within a fraction of an ounce, and the weight of heavy loads, up to hundreds of pounds, within a fraction of a pound, without requiring any extra space or devices.

In case the scale is intended for one kind of loads only, light or heavy, then, a single compartment well of half the size shown, with a single glass pipe and a single working fluid, of oil or mercury, according to the kind of loads for which it is intended, will be sufficient, and the construction simplified.

The design described and illustrated is applicable to any size of load, including freight cars and locomotives, thus being truly "universal."

What I claim is:

1. A universal pneumatic weighing scale, comprising a stationary cylinder with an open top and a flanged bottom with a blank bottom between and with vertical ribs outside, a movable flange with vertical ribs on top telescoping inside of said stationary cylinder and having a hole in centre closed by a cover, a corrugated flanged cylinder fastened with its bottom flange to the blank bottom inside of said stationary cylinder and with its top flange fastened to the bottom side of said movable flange and forming a closed contractible air space inside of said stationary cylinder, a movable cylinder with an open bottom and a flat top forming the weighing platform and telescoping outside of said stationary cylinder supported by the vertical ribs on top of said movable flange, means for holding said movable inner flange and outer cylinder suspended and said corrugated cylinder normally inflated, means for regulating the volume of said closed contractible air space and the drop of said weighing platform, a closed well with an air tight cover divided by a partition in two compartments one holding mercury the other oil with a nozzle on top connecting the closed air spaces within the well above these fluids with the contractible closed air space of said corrugated cylinder and provided with a bottom socket either side of the partition, means for instant communication and dis-communication of said closed air spaces with the outside atmosphere, double sockets with tri-way cocks connected to the bottom sockets of said closed well and holding upright glass pipes one containing a mercury column the other an oil column and provided with a graduation plate for indicating the weights, means for automatically closing the top of said glass pipe with the oil column when weighing heavy loads, substantially as and for purpose specified.

2. A pneumatic weighing scale, comprising a stationary cylinder with an open top and a flanged bottom provided with upward projecting pins for winding springs and with a blank bottom between with a screwed in fitting in centre for an air pipe connection and with several downward projecting sockets for housing fastening screws and provided with lifting lugs and with vertical ribs outside notched out at the top with a clip fastened on either side and holding bearing balls, a movable flange with vertical ribs on top telescoping inside of said stationary cylinder and having a hole in centre closed by a cover, a corrugated flanged cylinder fastened with its bottom flange to the blank bottom inside of said stationary cylinder and with its top flange fastened to the bottom side of said movable flange and forming a closed contractible air space inside of said stationary cylinder, a movable cylinder with an open bottom and a flat top forming the weighing platform and telescoping outside of said stationary cylinder supported by the vertical ribs on top of said movable flange, means for holding said movable inner flange and outer cylinder suspended and said corrugated cylinder normally inflated, means for regulating the volume of said closed contractible air space and the drop of said weighing platform, a closed well with an air tight cover divided by a partition in two compartments one holding mercury the other oil with a nozzle on top connecting the closed air spaces within the well above these fluids with the contractible closed air space of said corrugated cylinder and provided with a bottom socket either side of the partition, means for instant communication and dis-communication of said closed air spaces with the outside atmosphere, double sockets with tri-way cocks connected to the bottom sockets of said closed well and holding upright glass pipes one containing a mercury column the other an oil column and provided with a graduation plate for indicating the weights, means for automatically closing the top of said glass pipe with the oil column when weighing heavy loads, substantially as and for the purpose set forth.

3. A pneumatic weighing scale, comprising a stationary cylinder with an open top and a flanged bottom with a blank bottom between and with vertical ribs outside, and a movable flange with vertical ribs on top telescoping inside of said stationary cylinder with guiding clips fastened to some of the ribs and having a hole in centre closed by a fastened on cover, a corrugated flanged cylinder fastened with its bottom flange to the blank bottom inside of said stationary cylinder and with its top flange fastened to the bottom side of said movable flange and forming a closed contractible air space inside of said stationary cylinder, a movable cylinder with an open bottom and a flat top forming the weighing platform and telescoping outside of said stationary cylinder supported by the vertical ribs on top of said movable flange, means for holding said movable inner flange and outer cylinder suspended and said corrugated cylinder normally inflated, means for regulating the volume of said closed contractible air space and the drop of said weighing platform, a closed well with an air tight cover divided by a partition in two compartments one holding mercury the other oil with a nozzle on top connecting the closed air spaces within the well above these fluids with the contractible closed air space of said corrugated cylinder and provided with a bottom socket either side of the partition, means for instant communication and dis-communication of said closed air spaces with the outside atmosphere, double sockets with tri-way cocks connected to the bottom sockets of said closed well and holding upright glass pipes one containing a mercury column the other an oil column and provided with a graduation plate for indicating the weights, means for automatically closing the top of said glass pipe with the oil column when weighing heavy loads, substantially as and for the purpose described.

4. A pneumatic weighing scale, comprising a stationary cylinder with an open top and a flanged bottom with a blank bottom between provided with downward projecting sockets for housing screws and with vertical ribs outside, a movable flange with vertical ribs on top telescoping inside of said stationary cylinder and having a hole in centre closed by a cover, and a corrugated flange cylinder bolted on with its bottom flange to the blank bottom inside of said stationary cylinder and with its top flange bolted on to the bottom side of said movable flange with plate rings and rubber washers at the bolt heads to keep constant its contact area with said inner movable flange and forming an air tight closed contractible air space inside of said stationary cylinder and provided with springs between the upper and lower bolt heads for keeping said closed contractible air space normally inflated and containing a number of plates inside with holes in centre to form an air passage and fastened with screws to the sockets in the blank bottom inside of said stationary cylinder for regulating the volume of said closed air space, a movable cylinder with an open bottom and a flat top forming the weighing platform and telescoping outside of said stationary cylinder supported by the vertical ribs on top of said movable flange, means for regulating the drop of said weighing platform, a closed well with an air tight cover divided by a partition in two compartments one holding mercury the other oil with a nozzle on top connecting the closed air spaces within the well above these fluids with the contactible closed air space of said corrugated cylinder and provided with a bottom socket either side of the partition, means for instant communication and dis-communication of said closed air spaces with the outside atmosphere, double sockets with tri-way cocks connected to the bottom sockets of said closed well and holding upright glass pipes one containing a mercury column the other an oil column and provided with a graduation plate for indicating the weights, mean for automatically closing the top of said glass pipe with the oil column when weighing heavy loads, substantially as and for the purpose specified.

5. A pneumatic weighing scale, comprising a stationary cylinder with an open top and a flange bottom provided with upward projecting pins for winding springs and with a blank bottom between and with lifting lugs and with vertical ribs outside notched out at the top with a clip fastened either side holding bearing balls, a movable flange with vertical ribs on top with guiding clips on some of them telescoping inside of said stationary cylinder and having a hole in centre closed by cover, a corrugated flanged cylinder fastened with its bottom flange to the blank bottom inside of said stationary cylinder and with its top flange fastened to the bottom side of said movable flange and forming a closed contractible air space inside of said stationary cylinder, and a movable cylinder with an open bottom and a flat top forming the weighing platform provided inside with downward projecting pins opposite those on the bottom flange of said stationary cylinder for winding springs to balance the platform and with horizontal ribs inside coinciding with and resting on top of the vertical ribs with guiding clips on some of them on top of said movable flange and provided with vertical ribs inside coinciding with the vertical ribs with clips and bearing balls on said stationary cylinder and telescoping outside of same and provided with cast on lugs engaging the lifting lugs on said stationary cylinder for lifting the scale bodily when lifting the weighing platform and provided with plate rings inside held in position by the balancing springs for regulating the drop of the weighing platform, a closed well with an air tight cover divided by a partition in two compartments one holding mercury the other oil with a nozzle on top connecting the closed air spaces within the well above these fluids with the contractible closed air space of said corrugated cylinder and provided with a bottom socket either side of the partition, means for instant communication and dis-communication of said closed air spaces with the outside atmosphere, double sockets with tri-way cocks connected to the bottom sockets of said closed well and holding upright glass pipes one containing a mercury column the other an oil column and provided with a graduation plate for indicating the weights, means for automatically closing the top of said glass pipe with the oil column when weighing heavy loads, substantially as and for the purpose set forth.

6. A pneumatic weighing scale, comprising a stationary cylinder with an open top and a flanged bottom with a blank bottom between with a screwed in fitting in centre for an air pipe connection and provided with vertical ribs outside, a movable flange with vertical ribs on top telescoping inside of said stationary cylinder and having a hole in centre closed by a cover, a corrugated flanged cylinder fastened with its bottom flange to the blank bottom inside of said stationary cylinder and with its top flange fastened to the bottom side of said movable flange and forming a closed contractible air space inside of said stationary cylinder, a movable cylinder with an open bottom and a flat top forming the weighing platform and telescoping outside of said stationary cylinder supported by the vertical ribs on top of said movable flange, and a closed well with an air tight cover divided by a partition in two compartments one holding mercury the other oil with a nozzle on top having a baffle inside forming the continuation of the inner partition and communicating with each other the air spaces above these two fluids and connected by a pipe with the screwed in fitting in the centre of the blank bottom inside of said stationary cylinder and provided with a cast on lug and a bottom socket either side of the partition and with a spring plug valve mounted in the cover for instant communication and dis-communication of the well interior with the outside atmosphere and provided with screw plugs in the cover for filling each well-compartment with its fluid, double sockets with tri-way cocks connected to the bottom sockets of said closed well and holding upright glass pipes one containing a mercury column the other an oil column and provided with a graduation plate for indicating the weights, means for automatically closing the top of said glass pipe with the oil column when weighing heavy loads, substantially as and for the purpose described.

7. A pneumatic weighing scale, comprising a stationary cylinder with an open top and a flanged bottom with a blank bottom between and with vertical ribs outside, a movable flange with vertical ribs on top telescoping inside of said stationary cylinder and having a hole in centre closed by a cover, a corrugated flanged cylinder fastened with its bottom flange to the blank bottom inside of said stationary cylinder and with its top flange fastened to the bottom side of said movable flange and forming a closed contractible air space inside of said stationary cylinder, a movable cylinder with an open bottom and a flat top forming the weighing platform and telescoping outside of said stationary cylinder supported by the vertical ribs on top of said movable flange, a closed well with an air tight cover divided by a partition in two compartments one holding mercury the other oil with a nozzle on top connecting the closed air spaces within the well above these fluids with the contractible closed air space of said corrugated cylinder and provided with a cast on lug and a bottom socket either side of the partition, and double sockets with ribs fastened to the lugs on said closed well with tri-way cocks connected to the bottom sockets of said closed well and holding upright glass pipes one containing a mercury column the other an oil column with inverted sockets on top of the glass pipes with air passages for communicating the pipe interior with the atmosphere with an extra socket on top of the glass pipe with the oil column provided inside with a float for automatically closing its top air passage when weighing heavy loads and provided with a graduation plate doubly marked for indicating the weights of light and heavy loads and fastened to the ribs on the sockets, substantially as and for the purpose specified.

In testimony whereof, I have hereunto signed my name, at Syracuse, in the county of Onondaga, and State of New York, this 9 day of April, 1923.

DAVID GUELBAUM.